United States Patent
Lin et al.

(10) Patent No.: US 9,612,752 B2
(45) Date of Patent: Apr. 4, 2017

(54) WRITING METHOD FOR SOLID STATE DRIVE

(71) Applicant: QUANTA STORAGE INC., Taoyuan (TW)

(72) Inventors: Cheng-Yi Lin, Taoyuan (TW); Ying-Kai Yu, Taoyuan (TW); Shih-Wei Chen, Taoyuan (TW); Yi-Long Hsiao, Taoyuan (TW)

(73) Assignee: QUANTA STORAGE INC., Taoyuan (TW)

( * ) Notice: Subject to any disclaimer, the term of this patent is extended or adjusted under 35 U.S.C. 154(b) by 11 days.

(21) Appl. No.: 14/731,095

(22) Filed: Jun. 4, 2015

(65) Prior Publication Data

US 2016/0202908 A1     Jul. 14, 2016

(30) Foreign Application Priority Data

Jan. 12, 2015    (CN) .......................... 2015 1 0013853

(51) Int. Cl.
     *G06F 12/02*      (2006.01)
     *G06F 3/06*      (2006.01)

(52) U.S. Cl.
     CPC ............ *G06F 3/061* (2013.01); *G06F 3/0604* (2013.01); *G06F 3/0638* (2013.01); *G06F 3/0653* (2013.01); *G06F 3/0685* (2013.01); *G06F 12/0238* (2013.01); *G06F 12/0246* (2013.01)

(58) Field of Classification Search
     CPC ............. G06F 12/0236; G06F 12/0246; G06F 2212/214; G06F 2212/7203
     USPC .................................................. 711/103, 102
     See application file for complete search history.

(56) References Cited

U.S. PATENT DOCUMENTS

| | | | |
|---|---|---|---|
| 2011/0072197 A1* | 3/2011 | Lund et al. .................... | 711/103 |
| 2011/0296089 A1* | 12/2011 | Seol et al. .................... | 711/103 |
| 2013/0246890 A1* | 9/2013 | Au et al. ........................ | 714/764 |
| 2014/0181363 A1* | 6/2014 | Hoang et al. ................. | 711/103 |
| 2016/0041924 A1* | 2/2016 | Fields et al. ................. | 714/6.23 |
| 2016/0092113 A1* | 3/2016 | Veal et al. ..................... | 711/103 |

* cited by examiner

*Primary Examiner* — Than Nguyen
(74) *Attorney, Agent, or Firm* — Rabin & Berdo, P.C.

(57) ABSTRACT

A writing method for SSD (SSD) is disclosed. When processing a write data request from an internal of the SSD, whether both the source physical address and the destination physical address of the write data are in a healthy state is checked; the destination physical address corresponding to the logical address of the write data is registered to the flash transmit layer (FTL); the write data stored in the source is directly written to the destination physical address to accelerate the write speed.

8 Claims, 6 Drawing Sheets

WRITING METHOD FOR SOLID STATE DRIVE

This application claims the benefit of People's Republic of China application Serial No. 201510013853.3, filed Jan. 12, 2015, the subject matter of which is incorporated herein by reference.

BACKGROUND OF THE INVENTION

Field of the Invention

The invention relates in general to a solid state drive (SSD), and more particularly to a writing method for processing data transfer inside the SSD when writing data to the SSD.

Description of the Related Art

Solid state drive (SSD) integrates NAND flash memory array into one single storage device. Due to the feature of storing data voltage by utilizing the voltage conversion of semiconductor, the SSD advantageously possesses quick data transfer rate, small volume, and light weight and has thus become a mainstream consumer electronic product when it comes to the storage of a large volume of data.

As indicated in FIG. 1, a flowchart for writing data to an SSD according to the prior art is shown. According to the prior art, the write data request received by the SSD mainly has two sources: one comes from the host, the other comes from the internal of the SSD. Firstly, a write data request is received from the host (step P1). Then, the write data is buffered to a dynamic random access memory (DRAM) of the SSD (step P2). Then, the buffered write data is encoded by an ECC encoder, and the encoded data is further added to the buffered write data (step P3), such that when the write data having been stored is read again, the data with erroneous signal is automatically corrected through the ECC encoded data to assure that the write data is read correctly. Then, the write data encoded by the ECC encoder is written to the flash memory of the SSD (step P4).

Secondly, the write data request comes from the internal of the SSD (step P5). Since each memory cell in the flash memory of the SSD is subjected to use frequency limitation, the memory cell will fail when the erase/write frequency exceeds the predetermined limitation. To prolong the lifespan, the SSD needs to execute wear leveling to move the written data to a memory block with lower erase/write frequency to reduce the average erase/write frequency. Also, the flash memory comprises several physical blocks. Each physical block contains a plurality of pages and is used as a data storage unit. When erasing data, the data is erased in the unit of physical block. Therefore, the deserted pages of the flash memory after updates cannot be immediately erased. Instead, the deserted pages are registered in the flash transmit layer (FTL) using the correspondence between logical address and physical address. Then, the SSD automatically executes a procedure for collecting rubbish blocks to move the few pages, which remain valid in the physical blocks, to other physical blocks first and then erase the data stored in the deserted physical blocks so that the physical blocks can be recycled.

When the SSD executes wear leveling or rubbish block collecting procedure process during the processing of a write data request, firstly, the data that will be moved to each flash memory needs (step P6) is read by the SSD. Then, the read data is further decoded as an original write data by the ECC encoder (step P7), and buffered to the DRAM of the SSD (step P2). After the destination position of the data is re-arranged, the buffered data is encoded by the ECC encoder and then added to the ECC encoded data (step P3). Lastly, the encoded data is written to the flash memory in the SSD (step P4).

According to the prior art, the DRAM normally has to at one hand receive the write data from the host and at the other hand receive the data read for the internal movement of the SSD and at the same time has to process the write data request for the flash memory. Consequently, the data cannot be accessed timely, and SSD data writing is delayed. Besides, during the write data process, the SSD not only buffers the host write data to the DRAM but also buffers the read internal write data to the DRAM. It is very likely that the DRAM is used to the limit and ends up with insufficient capacity, which will eventually affect the overall access efficiency of the SSD. Therefore, the SSD still has many problems to resolve when it comes to the method for writing data.

SUMMARY OF THE INVENTION

According to one embodiment of the present invention, a writing method for SSD is provided. By checking whether the source physical address of the data that needs to be moved inside the SSD and the destination physical address in the flash memory are in a healthy state, data is moved inside the SSD to accelerate the write speed.

According to another embodiment of the present invention, a writing method for SSD is provided. During the internal movement of SSD, data is directly moved without having to be buffered to the DRAM or encoded/decoded, so that the operation of the DRAM and the SSD is reduced and the overall access efficiency can thus be increased.

To achieve the above objects of the invention, the writing method for SSD comprises following steps. When processing a write data request from an internal of the SSD, whether both the source physical address and the destination physical address of the write data are in a healthy state is checked; the destination physical address corresponding to the logical address of the write data is registered to the flash transmit layer (FTL); the write data stored in the source is directly written to the destination physical address to accelerate the write speed The writing method for SSD further comprises following steps. If one of the source physical address and the destination physical address of the write data is found to be unhealthy, the write data stored in the source is read, decoded as an original write data having logical address and buffered to the DRAM. The original write data buffered to the DRAM is encoded again. The physical address in the destination is re-arranged by the SSD, and the destination physical address corresponding to the logical address of the original write data is registered on the FTL and then written to the physical address in the flash memory of the SSD.

DETAILED DESCRIPTION OF THE INVENTION

The above and other aspects of the invention will become better understood with regard to the following detailed description of the preferred but non-limiting embodiment (s). The following description is made with reference to the accompanying drawings.

Figure 1:
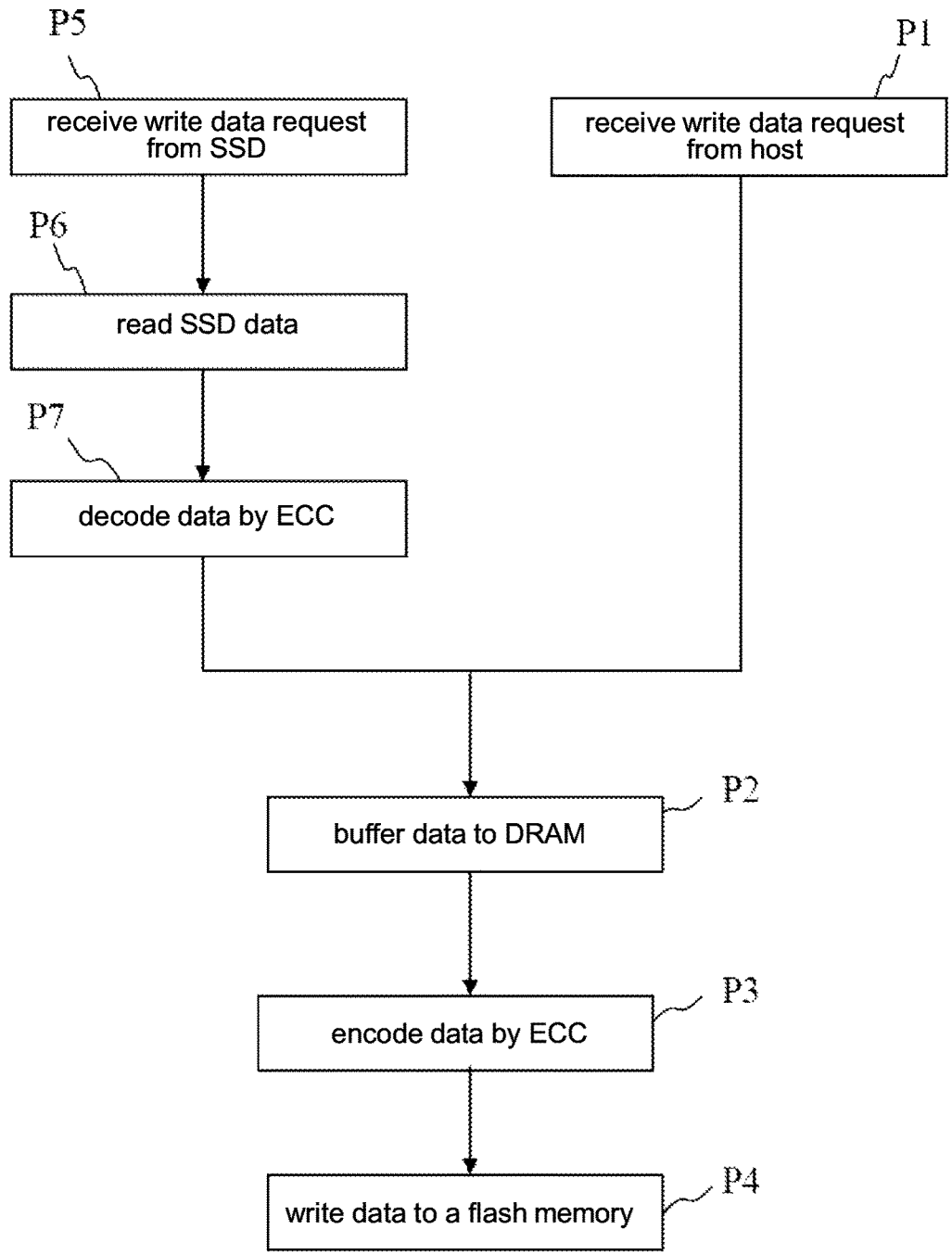
FIG. 1 is a flowchart for writing data to an SSD according to prior art.
Figure 2:
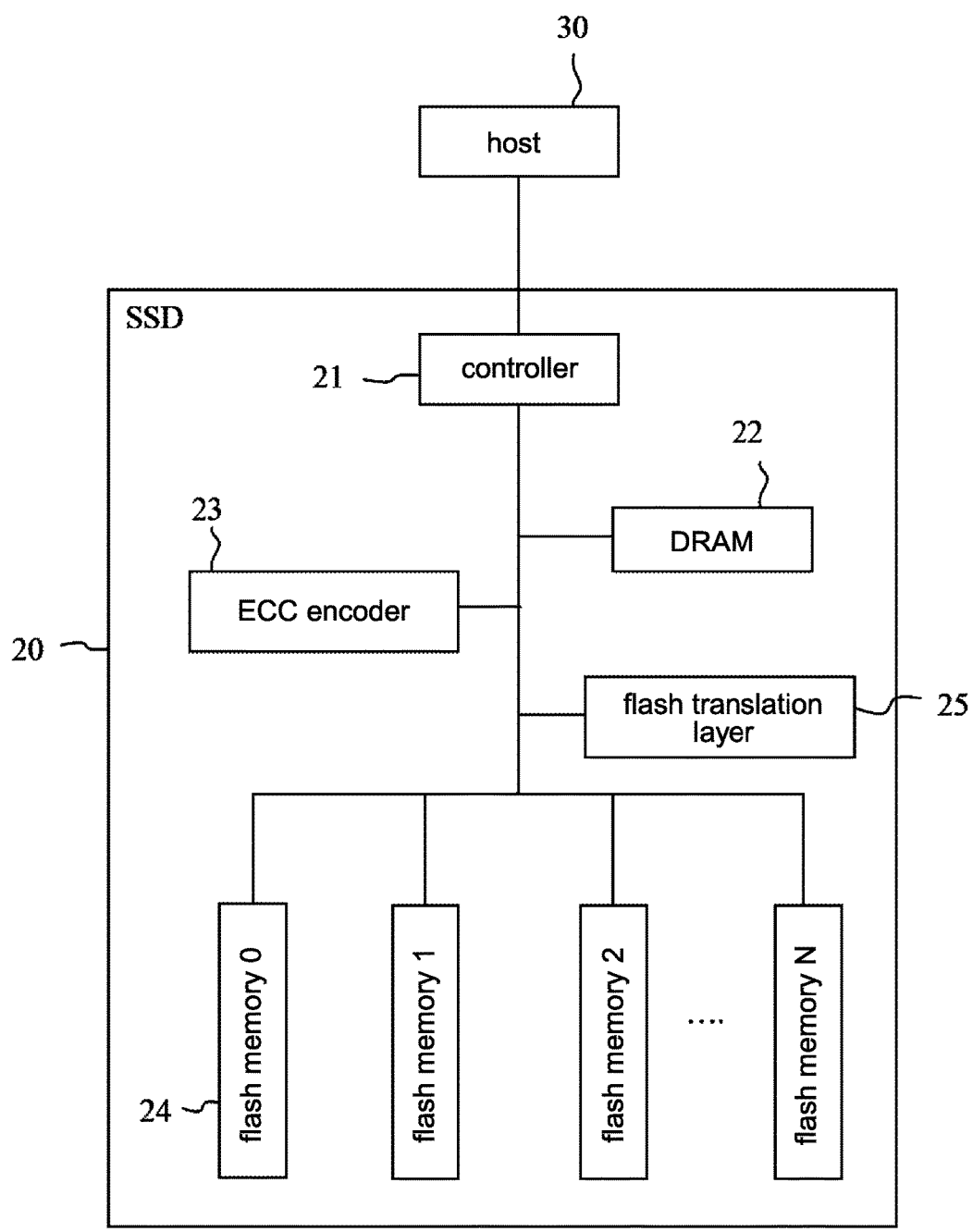
FIG. 2 is a system structure diagram of the SSD of the invention.
Figure 3:
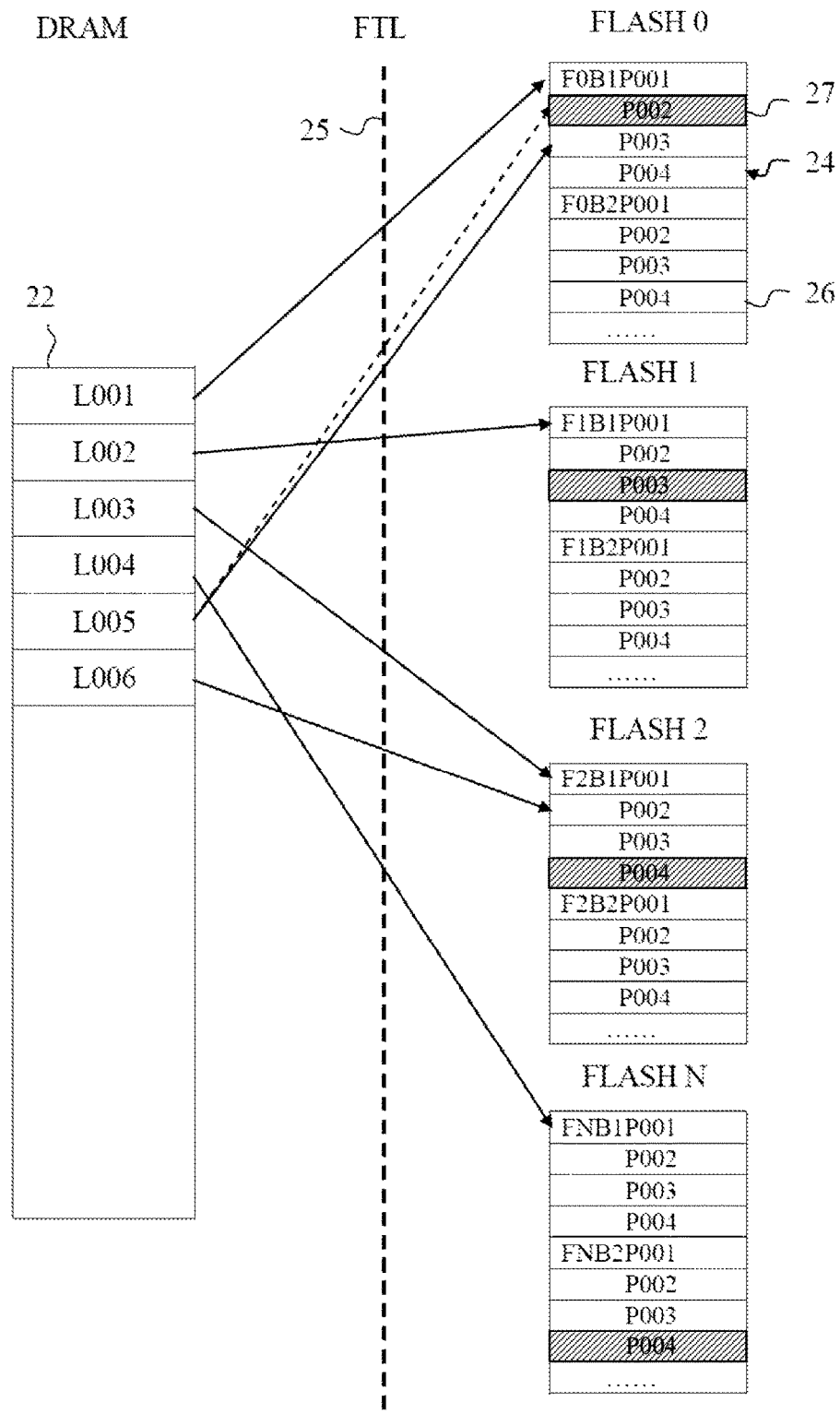
FIG. 3 is a schematic diagram of the SSD of the invention for processing a write data request coming from the host.
Figure 4:
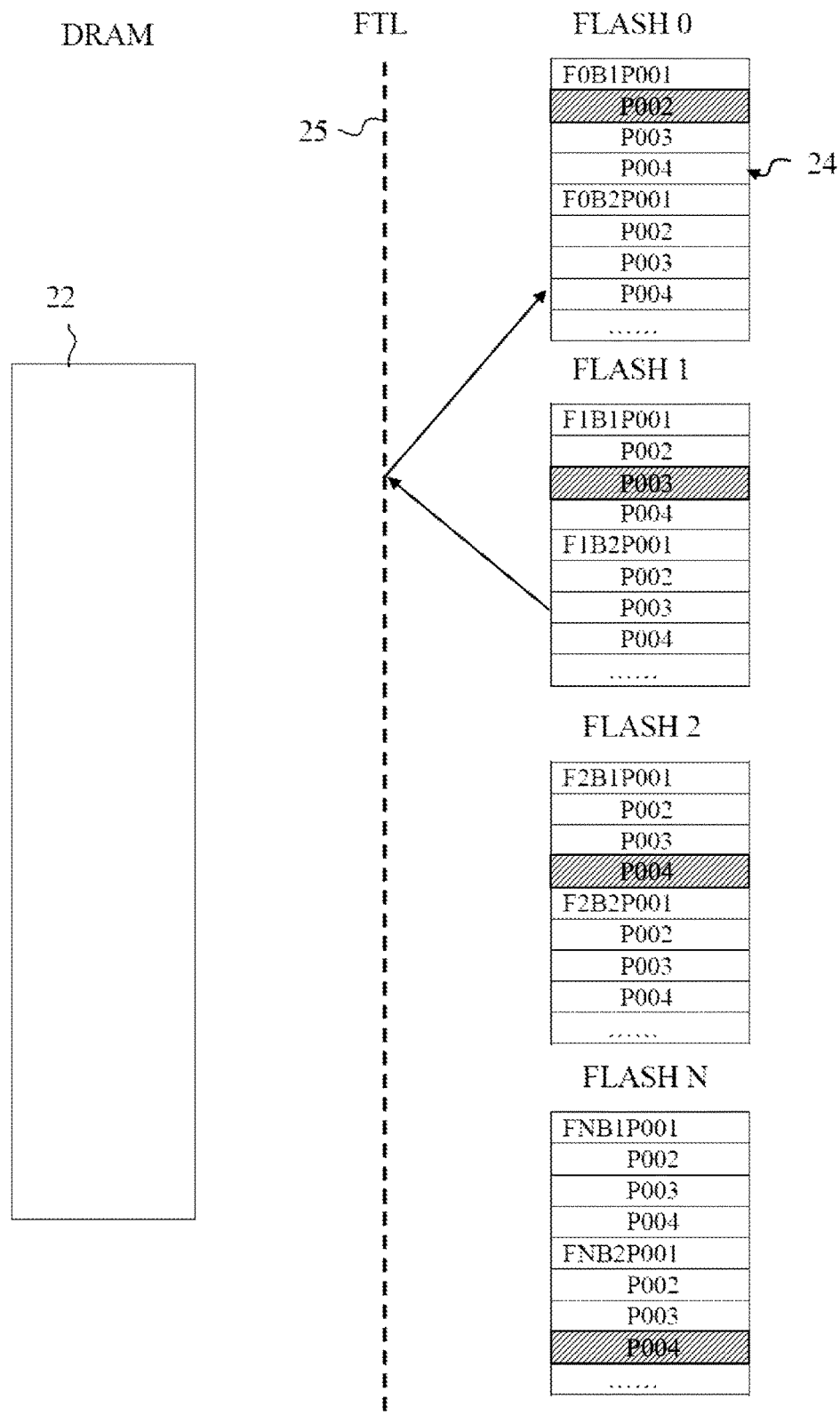
FIG. 4 is a schematic diagram of the SSD of the invention for processing a write data request from the internal of the SSD.

Referring to FIG. 2, FIG. 3 and FIG. 4. FIG. 2 is a system structure diagram of the SSD of the invention. FIG. 3 is a schematic diagram of the SSD of the invention for processing a write data request coming from the host. FIG. 4 is a schematic diagram of the SSD of the invention for processing a write data request from the internal of the SSD. The SSD system of the invention as illustrated in FIG. 2 is a generally known SSD system which comprises a solid state drive (SSD) 20 connected to a host 30. The host 30 transmits a request for accessing the SSD 20. The SSD 20, being a main data storage device for the host 30, comprises a controller 21, a dynamic random access memory (DRAM) 22, an error correction encoder (ECC encoder) 23, a plurality of flash memories (FLASH) 24 and a flash transmit layer (FTL) 25. The controller 21 controls the data of the host 30 to be buffered to a dynamic random access memory (DRAM) 22. The ECC encoder 23 encodes/decodes the buffered data to assure that the buffered data is read/written correctly. The controller 21 allocates the buffered data to each flash memory 24. The flash transmit layer (FTL) 25 records a mapping table between the logical address of the write data and the physical address of the data stored in each flash memory 24 to facilitate the access of data.

As indicated in FIG. 3, when processing a write data request coming from the host 30, the controller 21 of the SSD 20 receives the write data having logical address such as write data L001~L006 from the host 30, buffers the write data L001~L006 to the DRAM 22, and controls the ECC encoder 23 to encode the buffered write data. The controller 21 of the SSD 20 records blank or healthy page 26 of each flash memory 24 according to the FTL 25, and arranges each physical page 26 of the encoded write data according to the principles such as wear leveling, and registers the logical address of the write data and the physical address of the physical page 26 of the encoded write data to the FTL 25. Lastly, the controller 21 avoids the damaged page 27 in gray color as indicated in FIG. 3, and averagely writes each encoded write data to the arranged page 26 of each flash memory 24. For example, the write data L005, which would otherwise be buffered to the DRAM 22 as indicated by a dotted line, is buffered to the healthy page F0B1003 of the flash memory FLASH0 instead of the damaged page F0B1002 of the physical block F0B1.

Conversely, when the host 30 sends a request to read the data with logical address L001~L006 from the SSD 20, the controller 21 of the SSD 20 reads the data of the physical page 26 corresponding to the physical address according to the corresponding logical address recorded in the FTL 25. The ECC encoder 23 further decodes the encoded write data into an original write data, such as L001 to L006, and further buffers the original write data to the DRAM 22. During the process of reading the stored data, the ECC encoder 23 checks the healthy state of page 26 according to the decoding error rate of each page 26 and registers unhealthy page 26 as damaged page 27 to the FTL 25. Therefore, the FTL 25 not only includes management information regarding the correspondence between the logical address and the physical address of the data stored in the SSD 20 but also includes the management information regarding the healthy state of the page 26 in the physical block.

Figure 5:
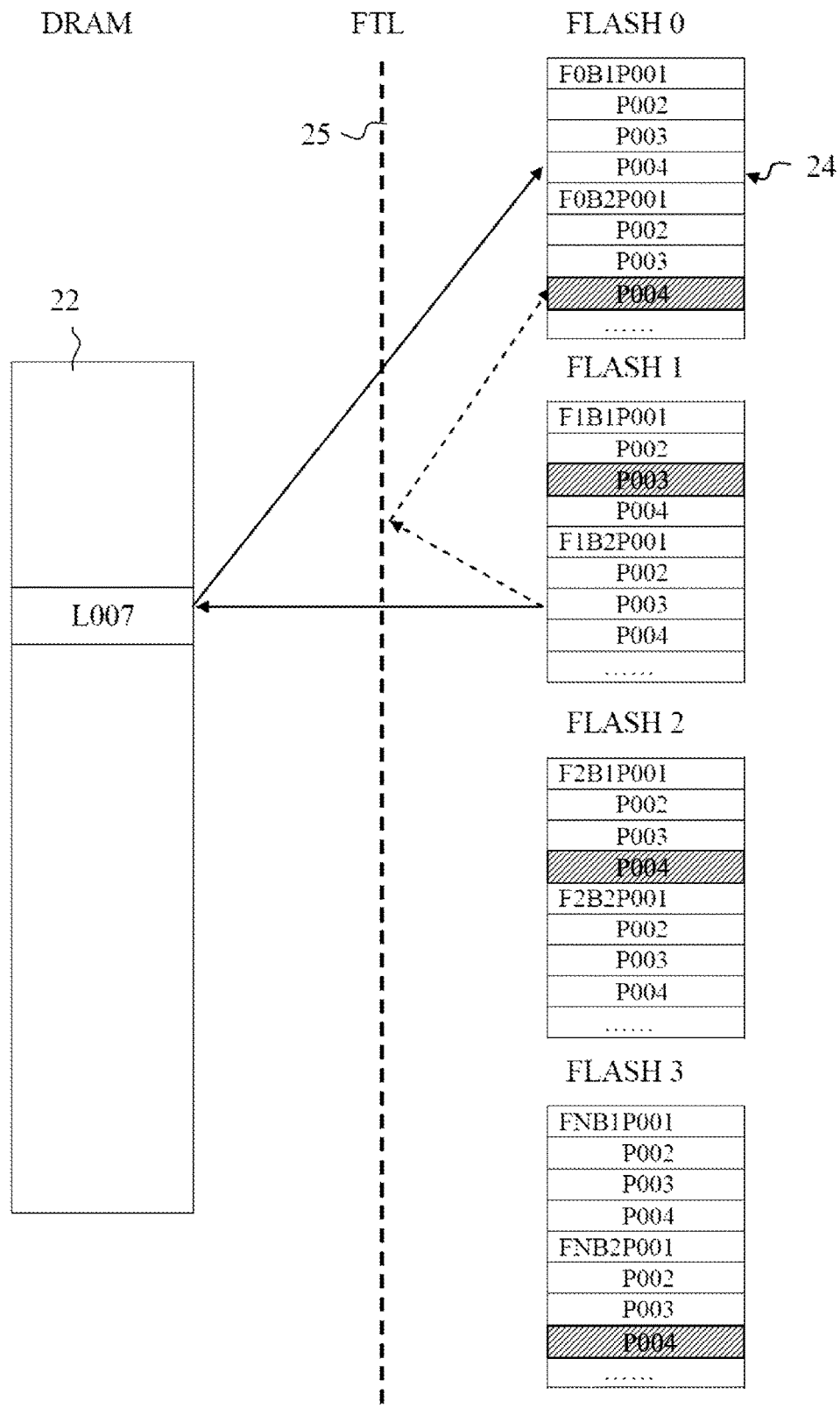
FIG. 5 is a schematic diagram of the SSD of the invention incapable of executing the internal write data request.

As indicated in FIG. 4, when processing an internal writing data request, the SSD of the invention 20, for example, needs to move the data stored in the page P003 of the physical block B2 of the flash memory FLASH1. Then, the controller 21 of the SSD 20 moves the data of the destination page F0B2P004 according to the plan of the FTL 25, and further checks the healthy state of the source page F1B2P003 of the moved data according to the management information regarding the healthy state of the registered physical block. If the data stored in the source page F1B2P003 maintains a good read/write state, then it is determined that the source page F1B2P003 is healthy; otherwise, it is determined that the source page F1B2P003 is unhealthy. Similarly, the controller 21 of the SSD 20 checks the healthy state of the destination physical page F0B2P004 according to the management information regarding the healthy state of the physical block registered to the FTL 25. If it is determined that both the source page and the destination page are healthy, then the encoded stored data of the source page F1B2P003, without having to be buffered to the DRAM 22 or being encoded/decoded, is controlled by the controller 31 of the SSD 20, which registers the movement position to the FTL 25 and directly writes the encoded stored data of the source page F1B2P003 to the destination page F0B2P004. Under the circumstance that data encoding remains intact, internal data movement can be completed, and the source page F1B2P003 can be directly mapped to the destination page F0B2P004, As indicated in FIG. 5, a schematic diagram of the SSD of the invention incapable of executing internal write data request is shown. When executing an internal write data request, the SSD of the invention checks the healthy state of the source page and the destination page according to the management information regarding the healthy state of the physical block registered to the FTL 25. If it is determined that one of the source page and the destination page of the moved data is unhealthy, errors may easily occur during the process of reading/writing or moving data and damage the stored data. For example, if the destination page F0B2P004 of the moved data is determined as unhealthy, as indicated in the dotted lines of FIG. 5, the source page F1B2P003 cannot be mapped to the destination page F0B2P004. Instead, the write data stored in the source is read, buffered to the DRAM and encoded/decoded, and then is then written to the flash memory of the SSD 24.

Therefore, when the data cannot be directly written to the flash memory of the SSD 24, the encoded stored in the source page F1B2P003 of the moved data is read as indicated in the solid lines of FIG. 5. Then, the logical address of the moved data is obtained from the FTL 25, decoded to such as an original write data L007 by the ECC encoder, buffered to the DRAM 22, and again is encoded by the ECC encoder. Then, the controller re-arranges and stores the data to the destination page F0B12P004, registers the physical address corresponding to the logical address of the moved data to the FTL 25, and then writes the moved data to the flash memory 24.

Figure 6:
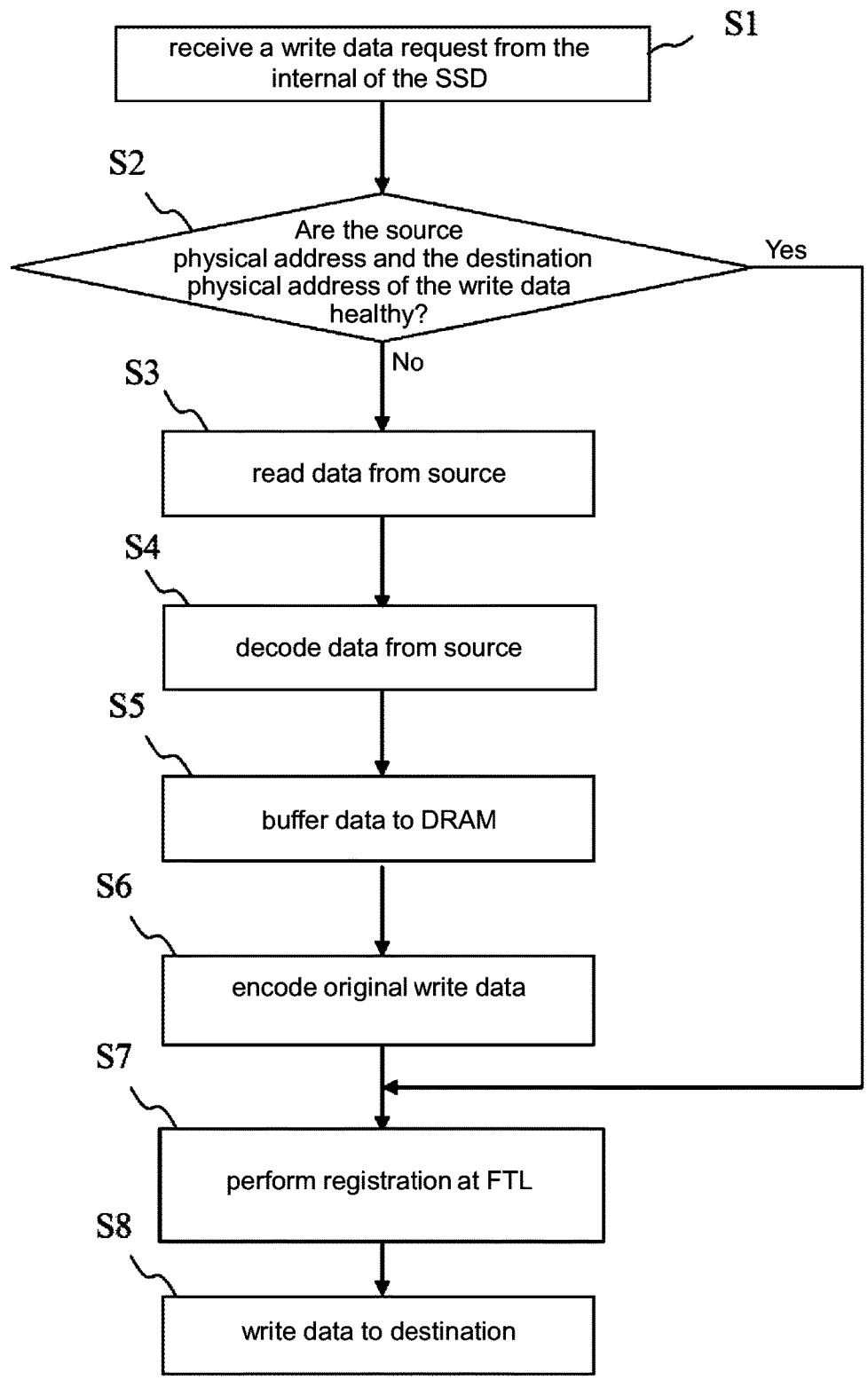
FIG. 6 is a flowchart of a writing method for the SSD of the invention.

As indicated in FIG. 6, a flowchart of a writing method for the SSD of the invention is shown. The writing method for SSD includes following steps. Firstly, the method begins at step S1, a write data request coming from the internal of the SSD is processed. In step S2, whether the source physical address and the destination physical address of the write data are healthy are checked according to the management information regarding the healthy state of the physical block registered to the FTL. If one of the source physical address and the destination physical address of the write data is unhealthy, then the method proceeds to step S3. In step S3, the encoded write data stored in the source is read. Then, the method proceeds to step S4, the encoded write data is decoded into an original write data having logical address. Then, the method proceeds to step S5, the original write data is buffered to the DRAM. Then, the method proceeds to step S6, the buffered original write data is again encoded, and is re-arranged and stored to the destination physical address by the SSD. In step S7, the correspondence between the logical address and the destination physical address of the original write data is registered to the FTL. Then, in step S8, data is written to the physical address in the flash memory.

In step S2 of checking whether the source physical address and the destination physical address of the write data are healthy, if both the source physical address and the destination physical address of the write data are healthy, then the method directly proceeds to step S7. In step S7, the correspondence between the logical address and the destination physical address of the original write data is registered to the FTL. Then, the method proceeds to step S8. In step S8, the encoded write data stored in the source is directly written to the destination physical address without having to be buffered to the DRAM and then encoded/decoded.

As disclosed above, when processing the request for moving data inside the SSD, if both the source physical address and the destination physical address of the moved data in the flash memory are healthy, the writing method for SSD directly moves data inside the SSD without having to buffer the data to the DRAM and then encode/decode the buffered data. The method of the invention, accelerates the write rate, reduces the operation of the SSD and the use of the DRAM and increases the overall access efficiency.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A writing method for solid state drive (SSD), comprising:
    processing a write data request from an internal of the SSD;
    checking whether physical addresses of a source and a destination of the write data are in a healthy state;
    registering to the FTL the physical address of the destination corresponding to a logical address of the write data; and
    directly writing the write data stored in the source to the physical address of the destination;
    wherein when one of the physical address of the source and the physical address of the destination of the write data is found to be unhealthy, the write data stored in the source is read, buffered to the DRAM, and then written to a flash memory of the SSD.

2. The writing method for SSD according to claim 1, wherein when processing the write data request from the internal of the SSD, the SSD arranges the destination of the write data according to the FTL.

3. The writing method for SSD according to claim 1, wherein said directly writing the write data is executed inside the SSD without having to be buffered to a dynamic random access memory (DRAM) or encoded/decoded.

4. The writing method for SSD according to claim 2, wherein said directly writing the write data is executed by mapping the physical address of the source to the physical address of the destination.

5. The writing method for SSD according to claim 1, wherein whether the physical address of the source and the physical address of the destination are healthy is checked according to a management information of a healthy state registered to the FTL.

6. The writing method for SSD according to claim 1, wherein the write data stored in the source is read, decoded as an original write data having the logical address and buffered to the DRAM.

7. The writing method for SSD according to claim 6, wherein the SSD re-arranges the physical address of the destination of the original write data buffered to the DRAM.

8. The writing method for SSD according to claim 7, wherein the SSD registers a logical address corresponding to a moved physical address of the destination of the original write data at the FTL, and then writes the original write data to the physical address of the flash memory.

* * * * *